D. HARRIGAN.
Car Brake.
No. 16,011.
Patented Nov. 4, 1856.
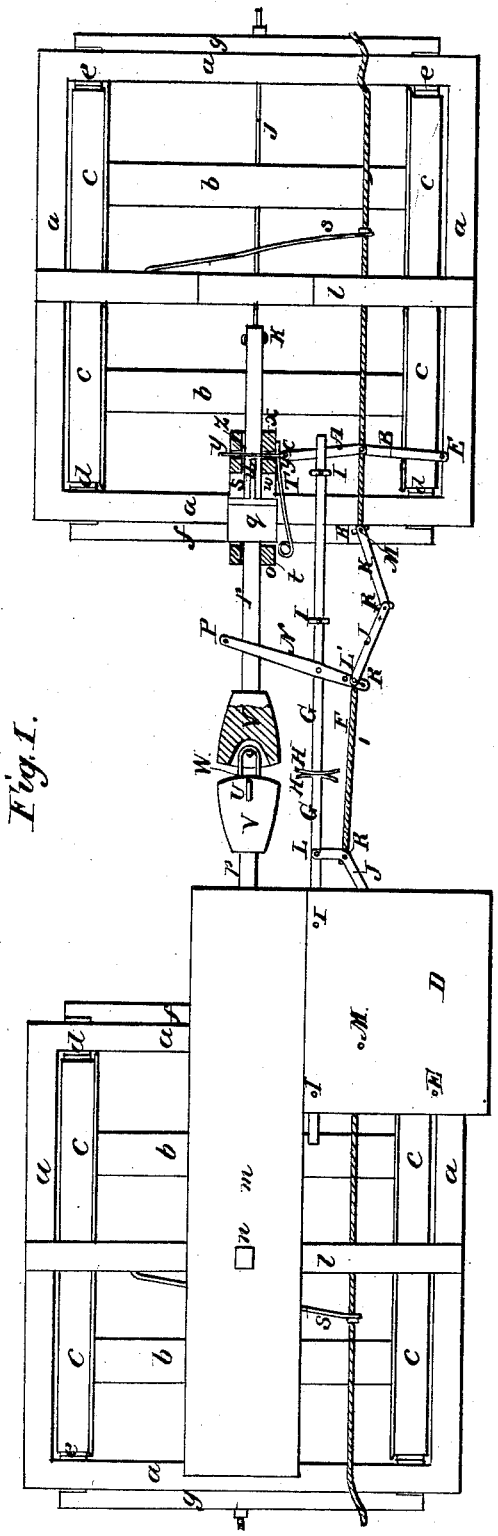
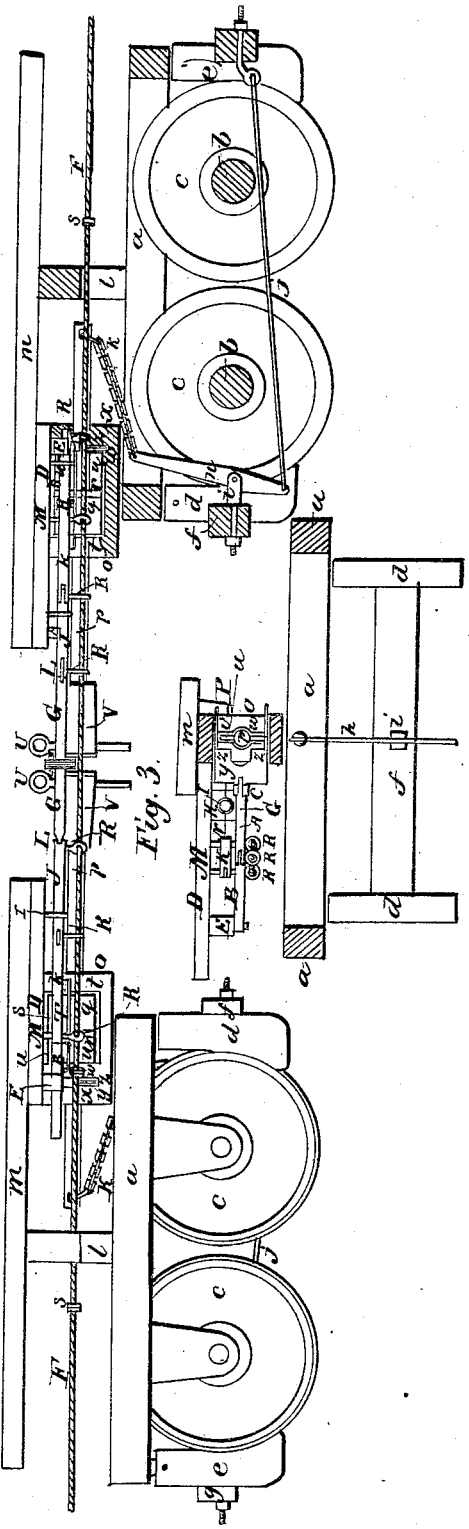

UNITED STATES PATENT OFFICE.

DENNIS HARRIGAN, OF WINCHESTER, MASSACHUSETTS.

RAILROAD-CAR BRAKE.

Specification of Letters Patent No. 16,011, dated November 4, 1856.

*To all whom it may concern:*

Be it known that I, DENNIS HARRIGAN, of Winchester, in the county of Middlesex and State of Massachusetts, have invented a new and Improved Compensation Attachment for Railroad-Car Brakes; and I do hereby declare that the following is a full and exact description thereof, reference being had to the accompanying drawings, and to the letters of reference marked thereon, in which—

Figure 1 is a plan of two truck frames shackled together, Fig. 2 is a longitudinal elevation of the same, and Fig. 3 is a transverse section of one of the truck frames.

The same letters refer to like parts in all the figures.

To enable others skilled in the art to make and use my invention, I will proceed to describe its construction and operation.

The truck frame $a$, $a$, $a$, $a$, is constructed in the usual form and supported by two shafts $b$, $b$, each shaft having two wheels $c$, $c$. The brake rubbers $d$, $d$, and $e$, $e$, are constructed the same as in the ordinary hand brakes now in common use, and hung to the truck frame in the usual manner, one before each forward truck and one behind each after truck. The brake rubbers $d$, $d$, are connected by a brake beam $f$, and the brake rubbers $e$, $e$, are connected by a similar brake beam $g$. I then hang a vertical brake lever $h$, to the center of the brake beam $f$, by a bolt $i$, near its lower end for its fulcrum; and the lower end of the said lever I connect to the brake beam $g$, by a bolt $j$; and the upper end I connect to the bumper rod a little back of the lever by a chain $k$. The transom $l$, is secured to the truck frame, running across the said frame near the center of its length; and the bumper plank $m$, is held to the transom by a bolt $n$. The perch $o$, is secured to the under side of the bumper plank near the end, through which the bumper rod $p$, is made to slide. On the bumper rod there is a rubber spring $q$, and directly back of the rubber spring there is a collar $r$, secured firmly to the bumper rod which makes a bearing for the spring; this rubber spring and collar is made to slide back and forth in an open space $s$, in the perch by the back and forward motion of the bumper rod. When the cars are drawn forward the rubber spring has a bearing against the forward partition $t$, of the perch. The collar $r$, has two thin tongues $u$, $u$, projecting backward, one above and one below the bumper rod and secured firmly to the said bumper rod; these tongues together with the bumper rod are fitted to slide back and forth in a corresponding vertical slot $v$, cut through the back partitions $w$, and $x$, of the perch. There is a stop $y$, standing transversely to the bumper rod and fitted to slide to and from the bumper rod in the space $z$, between the back partitions, $w$ and $x$, of the perch. This stop has two prongs $z$, $z$, one above and one below the bumper rod; and when the said stop is forced in against the bumper rod, the prongs straddle the rod and extend in by the end of the tongues $u$, $u$, and prevent the bumper rod from sliding back to apply the brakes.

A and B are levers hinged together forming a toggle joint; the end of the lever A, is connected to the stop by a pivot C, and the outer end of the lever B, is connected to the under side of the plank D, by a pivot E. The office of the toggle A B, is to slide the stop to or from the bumper rod. The stop and toggle taken together I call the toggle stop, there is one to each truck frame, they are operated by a continuous longitudinal chain or cord F, extending throughout the train; the said cord is made fast to each of the toggles so that by pulling the cord it will spring every toggle and draw all the stops in the train out from the bumper rods and allow the said bumper rods to slide back freely whenever the speed of the locomotive is checked.

In the ordinary mode of shackling cars together there is always some play or lost motion between the cars, which varies the distance between them while in motion, sometimes more and sometimes less; consequently a straight cord running throughout a train and attached to every toggle would not spring the toggles all alike unless some method was used for overcoming this lost motion. I will here describe the device I use for overcoming the lost motion and preserving a uniform tension on the cord so that all the toggles throughout the train may be sprung alike let the play or lost motion between the cars be what it may.

G, G, are compensation rods with a bumper plate H, on the end of each, where they come together; they are hung near the bumper rods and parallel to them and made to slide in the eye bolts I, I, projecting from the under side of the plank D. There is one compensation rod to each truck frame, and each of these rods has a compensation toggle made of two levers J, K, hinged together. In one of the compensation toggles the end of the lever J, is attached directly to the compensation rod by a pivot L, and the end of the lever K, is attached to the under side of the plank D, by a pivot M. In the other compensation toggle the end of the lever K, is also attached to the under side of the plank D, by a pivot M, and the end of the lever J, is attached to the end of the cross lever N, by a pivot L'; this cross lever extends across and is attached to the compensation rod by a pivot O, and the other end of the cross lever is attached to the under side of the bumper plank by a pin P, for its fulcrum. The object of the cross lever is to increase the throw of the toggle so as to take up the slack of the cord more effectually. The cross lever may be dispensed with and the toggle connected to the compensation rod, or if found necessary there may be two cross levers used, one to each compensation rod.

R R R are eyes projecting from the under side of the joints of the compensation toggles through which the cord F, is made to slip loosely.

S S are springs to give the proper strain on the cord necessary to keep the toggles A B, straight, and T T are springs to assist in holding the stops against the bumper rods.

The cars are shackled together in the usual manner by the shackle pins U, U, passing down through the bumpers V, V, and through the shackle W. The chain or cord F, passes through the eyes R, R, R, and is made fast to all of the toggles A B, and extends to the engineer, giving him full control of all the brakes in the train, he can have a windlass to wind up the cord or use any other means convenient. This cord may be all in one piece or it may be in sections hooked or coupled together between the cars, which would be more convenient in shackling and unshackling the cars. When this cord is properly adjusted and left to rest as it naturally would when not drawn or wound up by the engineer, it will hold the toggles A B, in a straight position so as to press the stops up against the bumper rods. In Fig. 1 it will readily be seen by introducing the compensation toggles and the compensation rods that the play in the shackling which is constantly causing a variation in the distance between the cars does not materially affect the tension of the cord; for when the bumpers come together and even crowd the bumper rods back, the compensation toggles spring out and spring the cord with them so as to preserve a uniform tension of the cord in all cases. It will also be readily perceived that the bumper plates H, H, are in all cases held together by the tension of the cord. When the engineer starts his train if he wishes to be prepared to brake up at any moment he will wind up the cord so as to draw all the stops out from the bumper rods and secure it in that position (as represented in Fig. 3); then in case of immediate danger if he should reverse the steam or check the speed of the locomotive the momentum of the train and the reaction of the locomotive would bring the bumpers together and force the bumper rods back and apply all of the brakes in the train in an instant. The common gearing for braking up by hand should be put on to the cars as usual and can be applied at any time either with or without the aid of the bumper rods. By this arrangement it is evident that the engineer, simply by reversing the steam, could apply the brakes and effectually brake up on every car in the train before a signal could possibly be given to the hand brakemen.

Having thus fully described the construction and operation of my improvements I will proceed to point the parts which I claim as my invention and desire to secure by Letters Patent.

The compensation rods G in combination with the levers J and K or their equivalents, operating in the manner and for the purpose substantially as herein described.

DENNIS HARRIGAN.

Witnesses:
CHAS. W. HAWKES,
FRANK HEDGE.